US012063333B2

(12) United States Patent
Nonaka et al.

(10) Patent No.: US 12,063,333 B2
(45) Date of Patent: Aug. 13, 2024

(54) IMAGE PROCESSING APPARATUS, CONTROL METHOD THEREOF, IMAGE READING APPARATUS, AND STORAGE MEDIUM THAT SHIFT INCLINED PANELS BASED ON PIXEL INCLINATION INFORMATION AND DIFFERENTIATING EDGE PIXELS FROM OTHER PARTS OF A SCANNED LINE

(71) Applicant: CANON KABUSHIKI KAISHA, Tokyo (JP)

(72) Inventors: Shota Nonaka, Kanagawa (JP); Katsutoshi Miyahara, Kanagawa (JP); Takehiko Kasamatsu, Kanagawa (JP); Tomoya Teraji, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/147,136

(22) Filed: Dec. 28, 2022

(65) Prior Publication Data
US 2023/0216970 A1    Jul. 6, 2023

(30) Foreign Application Priority Data

Jan. 5, 2022    (JP) ................................ 2022-000682

(51) Int. Cl.
*H04N 1/047*    (2006.01)
*H04N 1/03*    (2006.01)
(Continued)

(52) U.S. Cl.
CPC ............. *H04N 1/0473* (2013.01); *H04N 1/03* (2013.01); *H04N 1/2104* (2013.01);
(Continued)

(58) Field of Classification Search
CPC .... H04N 1/00718; H04N 1/03; H04N 1/0473; H04N 1/1017; H04N 1/1215;
(Continued)

(56) References Cited

U.S. PATENT DOCUMENTS 6,807,320 B1 * 10/2004 Sawada ................ H04N 1/3878
382/296
2013/0286451 A1 * 10/2013 Verhaegh ............. H04N 1/1934
358/521

(Continued)

FOREIGN PATENT DOCUMENTS

JP          3740910 B2     2/2006
JP     2008147855 A  *  6/2008
(Continued)

*Primary Examiner* — Chad Dickerson
(74) *Attorney, Agent, or Firm* — Venable LLP

(57) ABSTRACT

An image processing apparatus comprising: a storage unit configured to store image data read by scanning, with a linear sensor including pixels arranged in a main-scanning direction, an original in a sub-scanning direction orthogonal to the main-scanning direction, an acquisition unit configured to acquire inclination information indicating inclination of the image data, and a readout unit configured to read out the image data from the storage unit, with shifting, in accordance with the inclination information, a line position in the sub-scanning direction by each predetermined number of pixels in the main-scanning direction, wherein the readout unit reads out the image data from the storage unit, based on the inclination information, differentiating the predetermined number of pixels between an edge in the main-scanning direction and other parts.

13 Claims, 17 Drawing Sheets

(51) Int. Cl.
  *H04N 1/21* (2006.01)
  *H04N 1/028* (2006.01)
  *H04N 1/12* (2006.01)
(52) U.S. Cl.
  CPC ... *H04N 1/1215* (2013.01); *H04N 2201/0081* (2013.01); *H04N 2201/04791* (2013.01)
(58) Field of Classification Search
  CPC ............... H04N 1/193; H04N 1/2104; H04N 2201/0081; H04N 2201/04791
  USPC ........................................................ 358/448
  See application file for complete search history.

(56) References Cited

U.S. PATENT DOCUMENTS

| | | | |
|---|---|---|---|
| 2017/0195518 A1* | 7/2017 | Watanabe | H04N 1/00068 |
| 2021/0218865 A1* | 7/2021 | Tsuchiya | H04N 1/6008 |
| 2023/0034290 A1* | 2/2023 | Sugano | H04N 1/193 |

FOREIGN PATENT DOCUMENTS

| | | | | | |
|---|---|---|---|---|---|
| JP | 2011145687 A | * | 7/2011 | ......... | G03G 15/5008 |
| JP | 2012171126 A | * | 9/2012 | | |

* cited by examiner

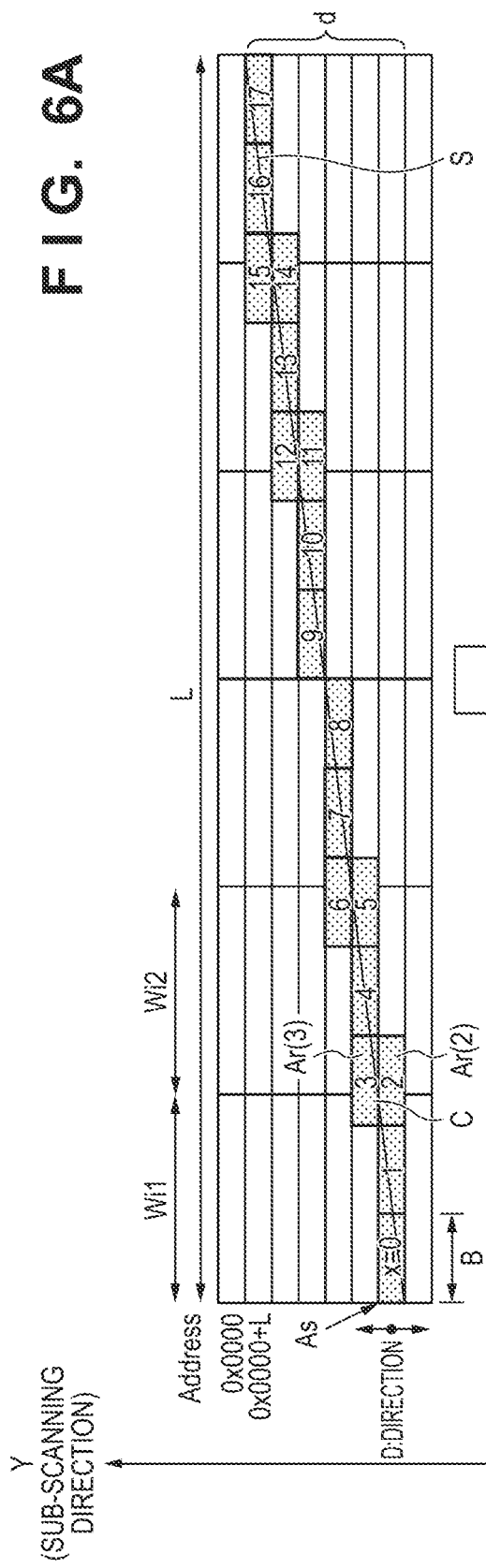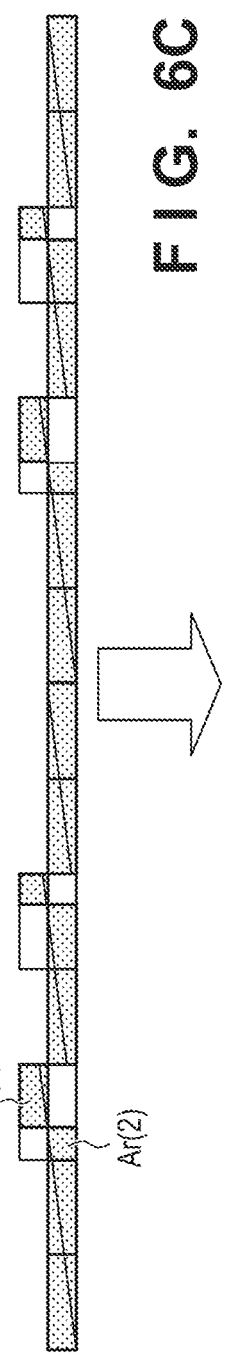

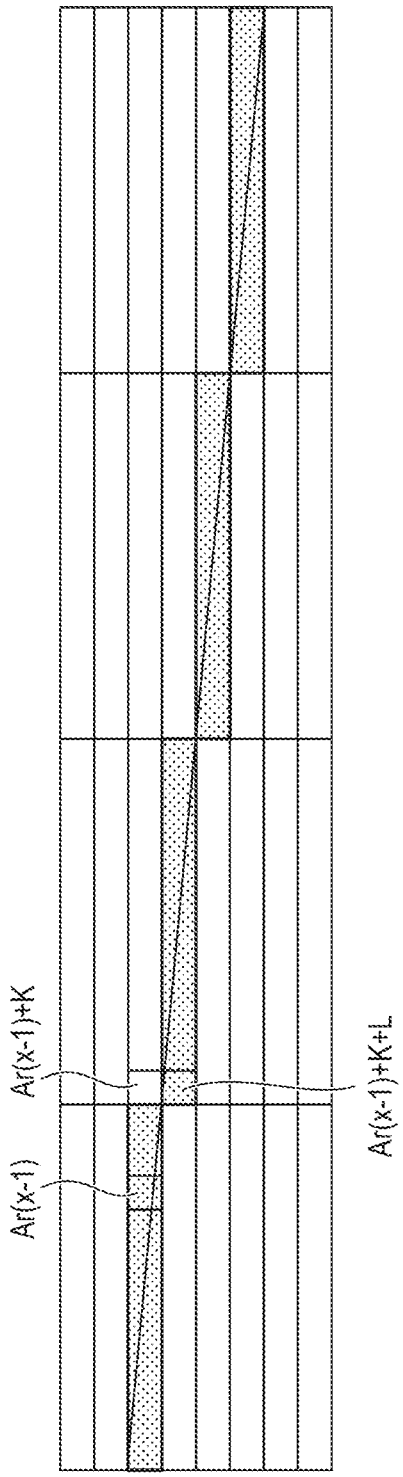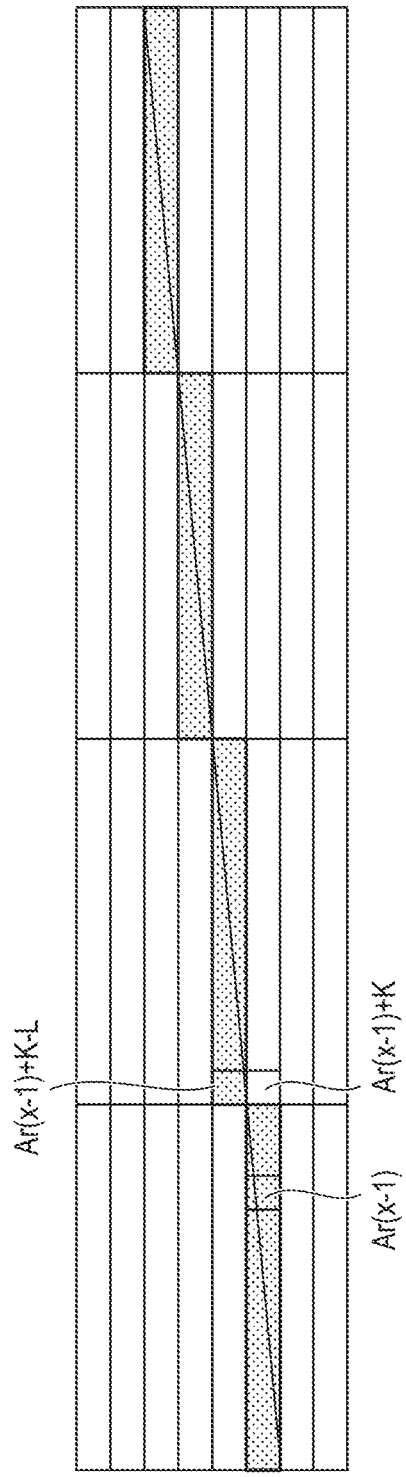

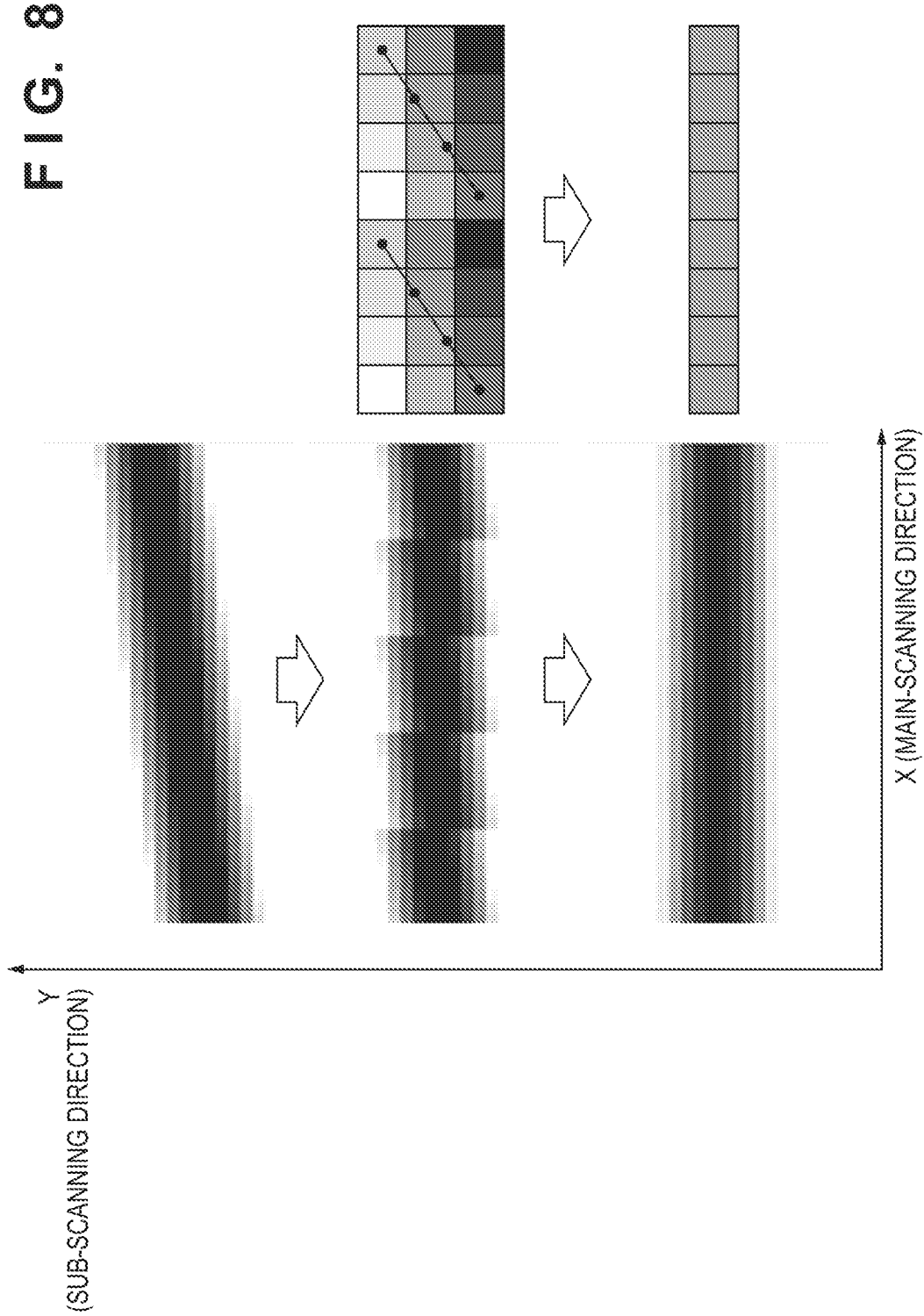

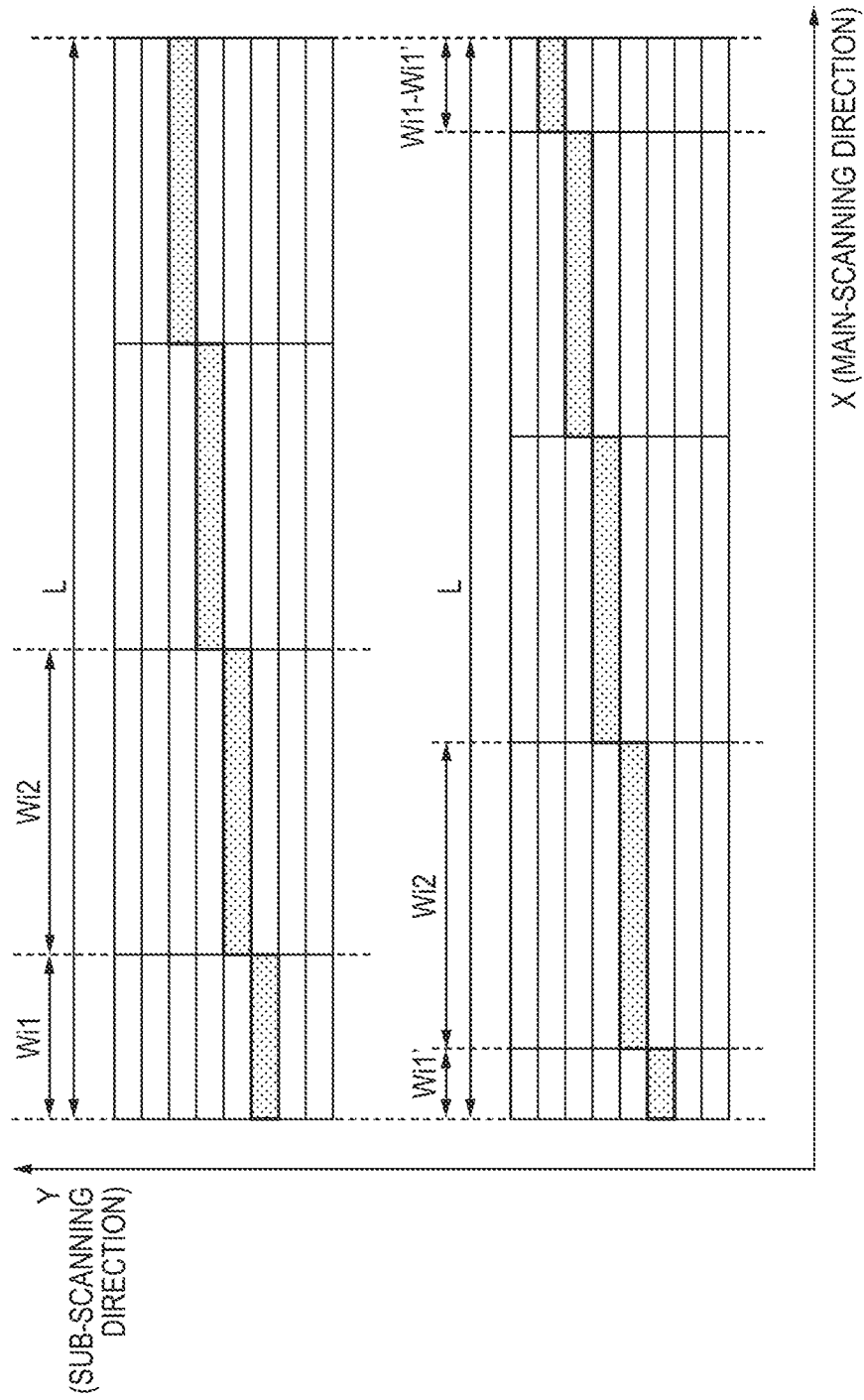

IMAGE PROCESSING APPARATUS, CONTROL METHOD THEREOF, IMAGE READING APPARATUS, AND STORAGE MEDIUM THAT SHIFT INCLINED PANELS BASED ON PIXEL INCLINATION INFORMATION AND DIFFERENTIATING EDGE PIXELS FROM OTHER PARTS OF A SCANNED LINE

CROSS REFERENCE TO PRIORITY APPLICATION

This application claims the benefit of Japanese Patent Application No. 2022-000682, filed Jan. 5, 2022, which is hereby incorporated by reference herein in its entirety.

BACKGROUND OF THE INVENTION

Field of the Invention

The present invention relates to a technique for correcting inclination of image data read from an original.

Description of the Related Art

A flat-bed scheme, a sheet-feed scheme, and the like, are generally known as schemes for reading apparatuses that read an image of a sheet-type original. A flat-bed scheme is a scheme in which the original is placed on a flat base and scanned by moving a linear image sensor that includes the base or a light source, and a light-receiving unit being integrated. A sheet feed scheme is a scheme in which, the original is read with conveying the original, by rotating a conveyance roller with a conveyance motor, at a constant speed in a direction orthogonal to the arrangement direction of the linear image sensor that is fixed inside the apparatus. For reading a particularly large original exceeding the A3 size, a sheet feed scheme, which allows easy downsizing of the apparatus, is usually employed, and, in such a case, a wide image is read by conveying the original with a plurality of linear image sensors arranged in a staggered manner in which the plurality of linear image sensors are shifting at a regular interval in the conveyance direction of the original.

In either case, distortion may occur in the read image when the orthogonal relation between the arrangement direction of the sensor and the movement direction of the original or the sensor is loosened due to the placement state of the original or the mounting state of the linear image sensor. Although inclination of the original may be rectified by the placement or conveyance state of the original, inclination of the linear image sensor is particularly difficult to adjust from a state in which once they are assembled on the apparatus, and, therefore, needs to be electrically corrected.

To correct the inclination, there is known a method of adjusting and correcting the access position to a memory. The aforementioned method temporarily stores, in the memory, the image data of the original read in an inclined state, and reads out the data with shifting the address in accordance with the inclination when reading out the stored image data from the memory again.

In the method described in Japanese Patent No. 3740910, deviation in the sub-scanning direction due to inclination of the read image is corrected, while the readout line position in a sub-scanning direction is being changed, in reading image data, for each area that is obtained equally dividing by an integer in the main-scanning direction. However, correction of the readout line position in the sub-scanning direction is performed pixel by pixel, and, therefore, the number of pixels to be read in the main-scanning direction may be equally divided, provided that the maximum amount of line deviation in the sub-scanning direction due to inclination is an integer multiple of the pixel width. For example, inclination of two pixels in the sub-scanning direction can be accurately corrected by equally dividing the main-scanning pixel width by two. However, an accurate reading width in the main-scanning direction cannot be set when the maximum amount of line deviation includes a component smaller than one pixel, and, thus, the precision of correction may degrade.

SUMMARY OF THE INVENTION

The present invention, which has been made in view of the above-described problems, improves the correction precision on correcting inclination of an image read by an image reading apparatus.

According a first aspect, the present invention provides an image processing apparatus includes a storage unit configured to store image data read by scanning, with a linear sensor including pixels arranged in a main-scanning direction, an original in a sub-scanning direction orthogonal to the main-scanning direction, an acquisition unit configured to acquire inclination information indicating inclination of the image data, and a readout unit configured to read out the image data from the storage unit, with shifting, in accordance with the inclination information, a line position in the sub-scanning direction by each predetermined number of pixels in the main-scanning direction, wherein the readout unit reads out the image data from the storage unit, based on the inclination information, differentiating the predetermined number of pixels between an edge in the main-scanning direction and other parts.

According to a second aspect, the present invention provides an image reading apparatus includes the image processing apparatus described above, and a reading unit configured to read by scanning an original in a sub-scanning direction orthogonal to the main-scanning direction, with a linear sensor including pixels arranged in a main-scanning direction.

According to a third aspect, the present invention provides a method of controlling an image processing apparatus that includes a storage unit configured to store image data read by scanning, with a linear sensor including pixels arranged in a main-scanning direction, an original in a sub-scanning direction orthogonal to the main-scanning direction, the method comprising acquiring inclination information indicating inclination of the image data, and reading out the image data from the storage unit, shifting, in accordance with the inclination information, a line position in the sub-scanning direction by each predetermined number of pixels in the main-scanning direction, wherein the reading out reads the image data from the storage unit, based on the inclination information, differentiating the predetermined number of pixels between an edge in the main-scanning direction and other parts.

Further features of the present invention will become apparent from the following description of exemplary embodiments with reference to the attached drawings.

BRIEF DESCRIPTION OF THE DRAWINGS

FIGS. 6A to 6C are diagrams illustrating a readout order of an image data by an address shift according to the first embodiment;

FIGS. 7A and 7B are diagrams illustrating an address calculation operation by the address shift according to the first embodiment;

FIG. 8 is a diagram illustrating gradation correction according to the first embodiment;

FIG. 15 is a diagram illustrating a setting method of an edge readout width according to the second embodiment.

DESCRIPTION OF THE EMBODIMENTS

Figure 1A:
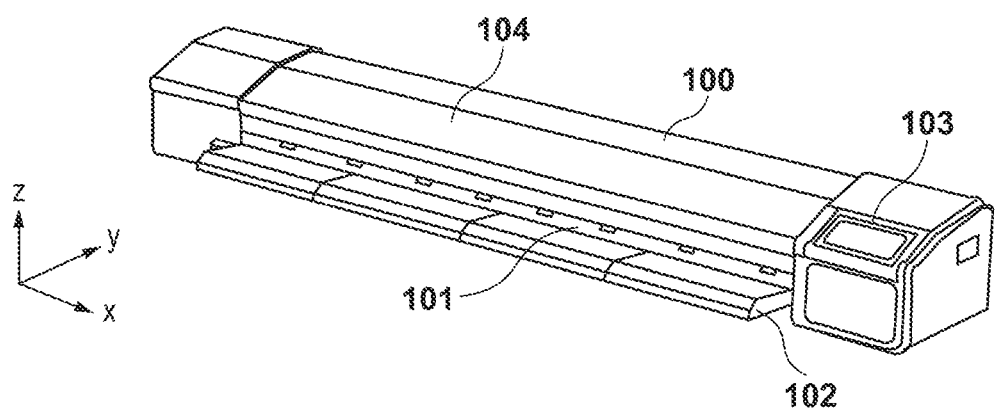
FIG. 1A is a perspective view and FIG. 1B is a cross-sectional view, each illustrating an overall configuration of a scanner according to a first embodiment of the present invention.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and a redundant description thereof is omitted.

First Embodiment

Figure 1B:
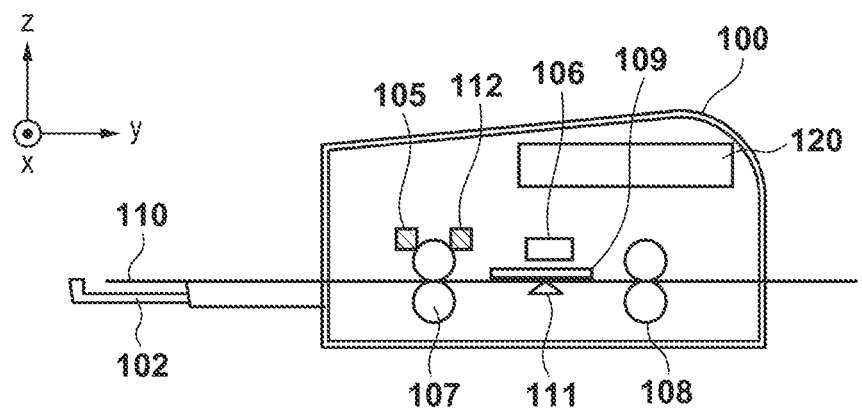

FIGS. 1A and 1B illustrate a configuration of a scanner of a sheet-feed scheme (image reading apparatus), which is a first embodiment of an image processing apparatus of the present invention.

FIG. 1A is a perspective view illustrating an appearance of a sheet feed scanner 100. As illustrated in FIG. 1A, the scanner 100 includes an original feeding port 101 and an original feeding base 102 at the front side of the main body.

A user places a leading edge of the original such that the central part of the original lies at the center of the original feeding port 101 on the original feeding base 102, and inserts the original into the original feeding port 101 by sliding the original on the base. The original feeding port 101 is designed to be tolerant of positional deviation, inclination, or the like, of the original in insertion of the original to a certain extent, with respect to the width of the original that can be read by the scanner 100. The configuration of the feeding path of the original will be described in detail, referring to FIG. 1B.

The scanner 100 includes an operation unit 103, which includes a physical key, an LCD panel (liquid crystal display panel), or the like, on the upper surface of the main body, and, thus, setting of reading conditions or inputting of the size of the original can be performed. In addition, the scanner 100 includes an upper cover 104 on the upper surface thereof, and the reading unit or the like can be accessed by opening the upper cover 104 to upside, allowing maintenance of the main body.

FIG. 1B is a diagram illustrating an internal configuration of the scanner 100. In the cross-sectional view of FIG. 1B, the left side is the upstream side and the right side is the downstream side of the original feeding, and the original is conveyed in the Y-axis (sub-scanning) direction. An original 110 fed along the original feeding base 102 by the user is discharged from the rear surface of the main body through a flat conveyance path. An original detection sensor 105 is a sensor configured to detect insertion of the original 110 and, upon detecting insertion of the original 110, causes an upstream side conveyance roller 107 to rotate to draw the original into the conveyance path. An edge detection sensor 112 is used for detecting the leading edge of the original 110 drawn into the conveyance path by rotation of the upstream side original conveyance roller 107. The result of detection by the edge detection sensor 112 is used for determining a reading starting position of the original 110, or detecting a trailing edge position of the original 110, and the like.

In the conveyance path, the original 110 passes between a glass plate 109 and an original pressing plate 111. The original pressing plate 111 serves to press the original 110 against the glass plate 109 with a predetermined pressure. A CIS (contact image sensor) 106 is a linear image sensor that includes the reading surface arranged in a direction orthogonal to the conveyance direction of the original 110. The arrangement direction is defined as the main-scanning direction, and the conveyance direction of the original 110 is defined as the sub-scanning direction. In the following, a description is provided assuming that the linear image sensor is the CIS 106.

The reading surface of each of the CISs 106, which is facing the glass plate 109, is designed such that the focal position of reading lies on the contact surface between the original 110 and the glass plate 109. A downstream side original conveyance roller 108 is configured to be driven by a belt (not illustrated) in association with an upstream side original conveyance roller 107, and serves to discharge the original 110, to downstream side, which has exited from the area where the original is pressed against the glass plate 109 by the original pressing plate 111. An image reading control unit 120 includes a system controller 200 described below, and also includes detection sensors, a motor (not illustrated) configured to rotate the upstream side original conveyance roller 107, a circuit board configured to control the CIS 106, the operation unit 103, and the like.

Figure 2A:
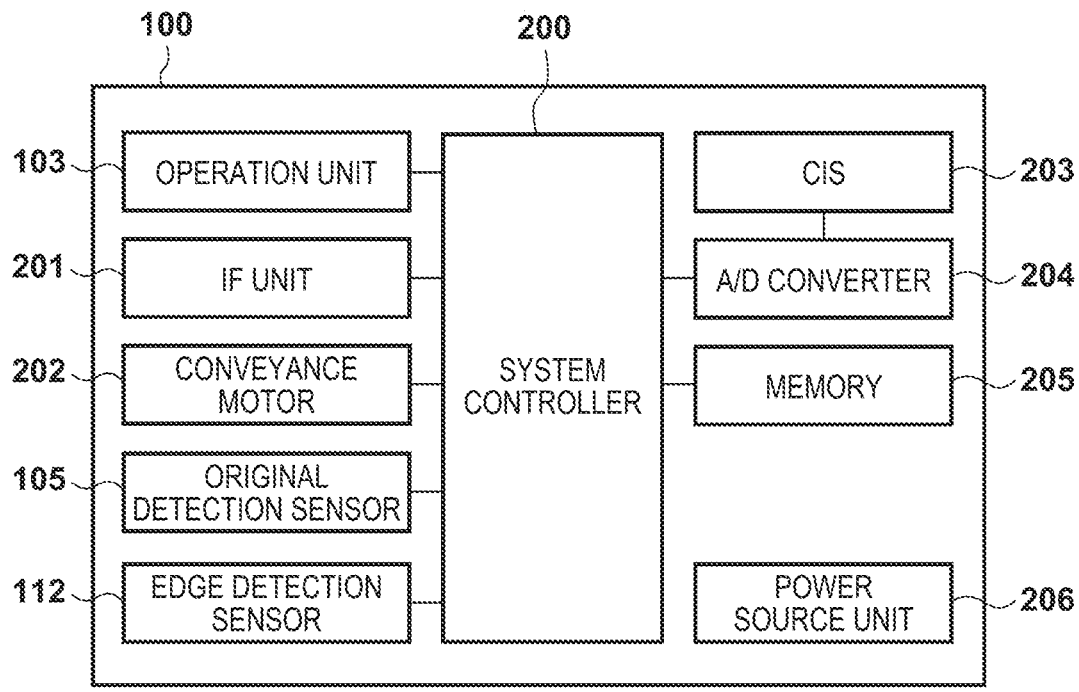
FIGS. 2A and 2B are block diagrams illustrating an electrical configuration of the scanner according to the first embodiment.

FIG. 2A is a block diagram illustrating an electrical configuration of the scanner 100. The scanner 100 includes the system controller 200, the operation unit 103, an IF unit 201, a conveyance motor 202, the original detection sensor 105, the edge detection sensor 112, the CIS 106, an A/D converter 204, a memory 205, and a power source unit 206.

Figure 2B:
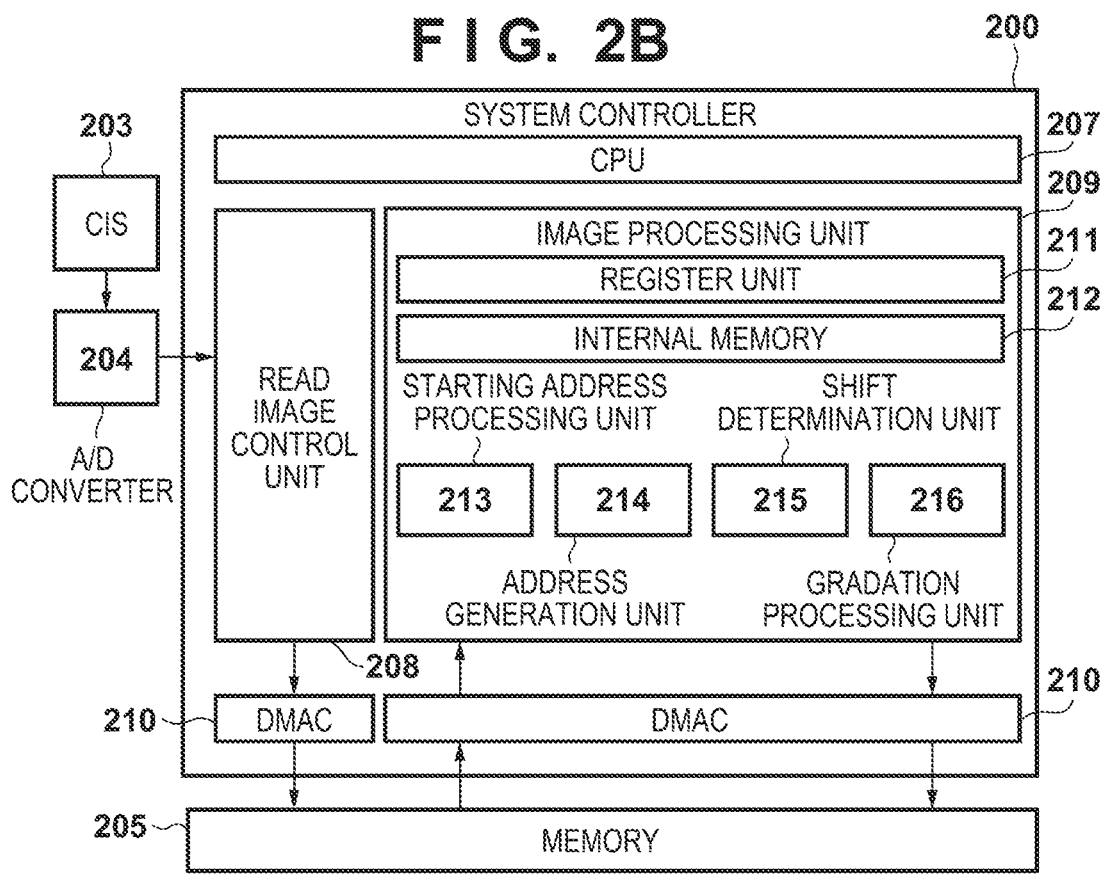

FIG. 2B is a block diagram illustrating an internal configuration of the system controller 200. The system controller 200 includes a CPU 207, a read image control unit 208, an image processing unit 209, and a Direct Memory Access Controller (DMAC) 210. Furthermore, the image processing unit 209 includes a register unit 211, an internal memory 212, a starting address processing unit 213, an address generation unit 214, a shift determination unit 215, and a gradation processing unit 216.

Returning to the description of FIG. 2A, the operation unit 103 includes a touch panel with an LCD. Information of the original to be read, settings of the reading apparatus, and the like, are displayed on the LCD of the operation unit 103 according to an instruction from the CPU 207, and the user can change the settings while checking the information displayed on the LCD of the operation unit 103, by the touch panel operation on the operation unit 103.

The conveyance motor 202 is controlled by the CPU 207 via a motor driver, and rotates the upstream side conveyance roller 107 and the downstream side conveyance roller 108. Outputs from the original detection sensor 105 and the edge detection sensor 112 are input to the CPU 207, and the CPU 207 determines the drive timing of the CIS 106 and performs reading control (image data acquisition), based on the change of the output signals from the sensors and the state of the conveyance motor 202.

The CIS 106 outputs the read image to the A/D converter 204 as an analog signal, and the A/D converter 204 converts the signal into a digital signal and inputs the converted signal to the system controller 200. The data converted into digital signals in the A/D converter 204 can be transmitted as image data to an external device connected by USB or LAN via the IF unit 201, after the data is subjected to a predetermined process. The power source unit 206 generates a voltage required by each unit and supplies electric power thereto.

In FIG. 2B, the CPU 207 executes various arithmetic operation processing to control the settings of the scanner and the activation of a DMAC 210 and the image processing unit 209. The DMAC 210 executes, with respect to a memory area specified in advance, reading/writing the image data from/to the memory 205. Here, the DMAC 210 can freely change the read and write addresses from and to the memory 205, according to the settings by the CPU 207. The read image control unit 208 receives, line by line, digital image data to be input to the system controller 200 from the A/D converter 204 and outputs the digital image data to the memory 205.

The image processing unit 209 reads, by using the DMAC 210, the image data written to the memory 205 by the read image control unit 208, and corrects the inclination of the image data. For example, the CIS 106 is assembled with an inherent inclination in accordance with the mounting tolerance. The original is conveyed in a direction perpendicular to the main-scanning direction with respect to the CIS 106 including the reading surface arranged in the main-scanning direction, however, if the CIS 106 has a certain angle with respect to the main-scanning direction, distortion (inclination) may occur in the image read by the CIS 106.

Figure 3A:
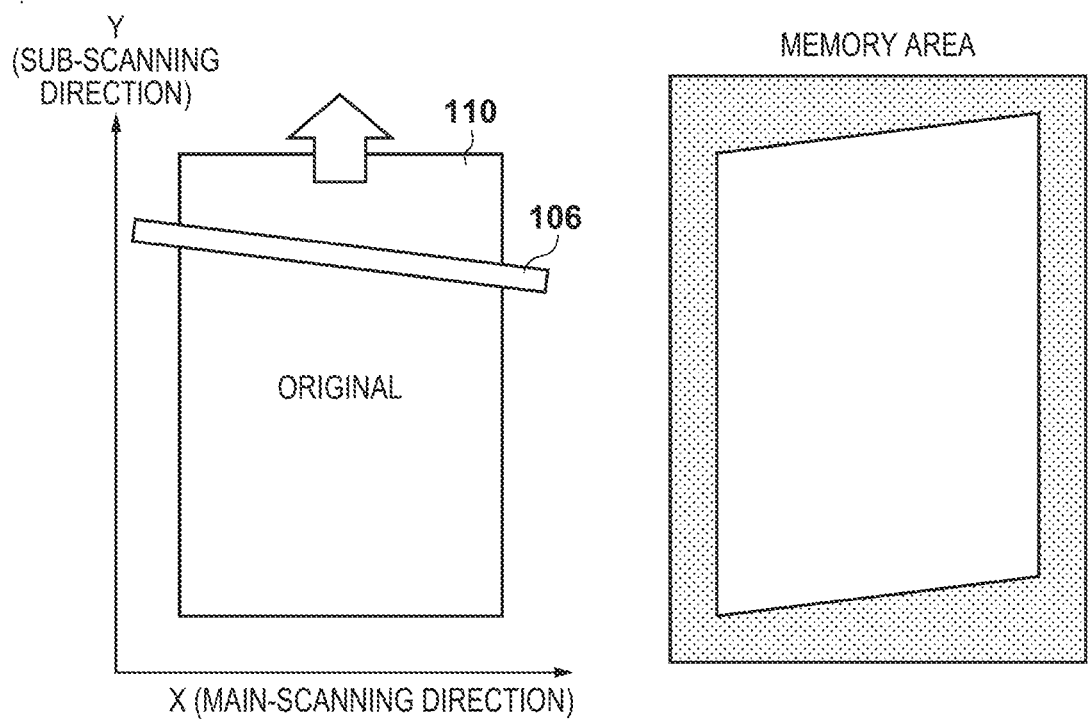
FIGS. 3A to 3C are diagrams illustrating distortion of image data due to inclination of a contact image sensor (CIS)

As illustrated in FIG. 3A, when the original is normally conveyed under the CIS 106 that is inclined by a certain angle, deviation occurs in the reading timings at both edges of the original. Accordingly, image data with deviation in the sub-scanning direction in accordance with the inclination is stored in the memory. The register unit 211, having stored therein inclination information required for correction, corrects the inclination using respective setting values adapted to processes. With regard to storing of setting values, the amount of inclination may be detected and stored, for example, by performing calibration such as reading inspection patterns at the time of factory shipment.

Figure 3B:
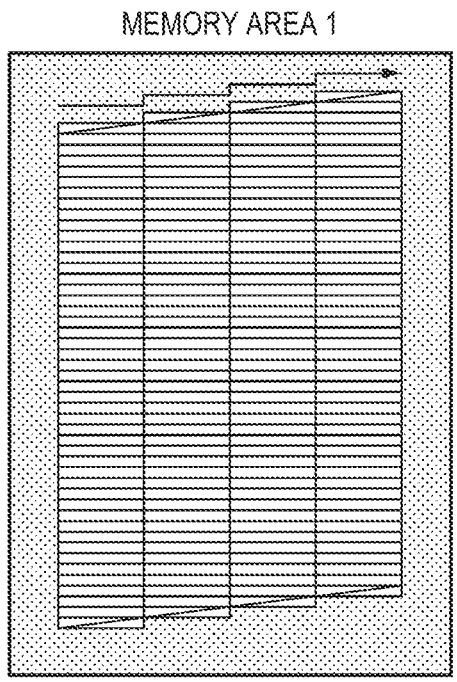
Figure 3C:
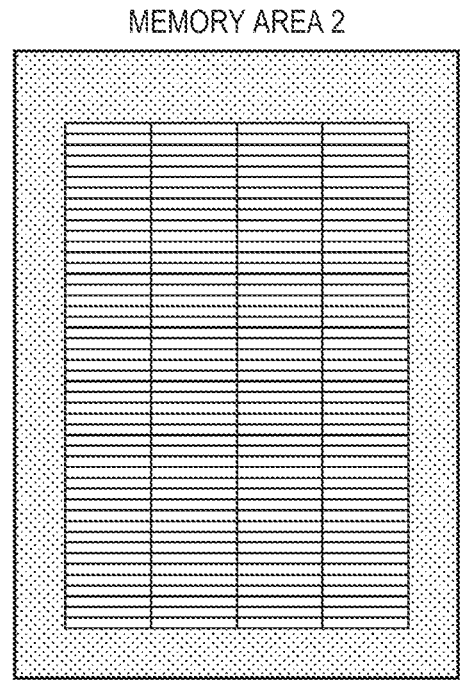

The starting address processing unit 213 generates, in cooperation with the address generation unit 214, the head address at the start of the line processing. The address generation unit 214 generates a reading address of image data at a constant interval from the head address in the main-scanning direction, depending on the presence or absence of correction. In case of executing inclination correction, readout is performed with shifting the readout line in the sub-scanning direction by the shift determination unit 215 as illustrated in FIG. 3B, and inclination is corrected by writing to the next memory area with the lines aligned, as illustrated in FIG. 3C. When processing of a number of pixels of one line is completed, the starting address processing unit 213 determines the readout starting position of the next line, and repeats as many processing lines as required. In order to improve the precision of inclination correction, the gradation processing unit 216 performs a filtering process with changed weights with respect to readout number of pixels of each line that has been read out with shifting. On this occasion, the required data is stored in the internal memory 212.

As a reading procedure, for example, the user places the leading edge of the original 110 such that the central part of the original lies at the center of the original feed port on the original feeding base 102, and inserts the original into the original feeding port 101 by sliding the original on the base. When the original detection sensor 105 and the edge detection sensor 112 detects that the original 110 is set, the user operates the operation unit 103 to start reading.

The read image is stored in the memory 205 by the read image control unit 208. Here, different areas are assigned for the memory area to store above described read image, and the memory area for the image data processed by the image processing unit 209. As for the memory buffer area (an area for storing a part of the image data) of the CIS 106 to which the read image control unit 208 writes data, for example, twice the number of lines of the line shift numbers in a case of an occurrence of a maximum mounting tolerance in the CIS 106, are secured as a margin. In case the maximum inclination amount is four lines, an area of eight lines is secured, and the buffer is made to perform ring operation with adjusting the timings of writing by the read image control unit 208 and reading out by the image control unit 209, and, thus, memory space is saved.

When the read image control unit 208 has completed writing of as many lines as the maximum shifts, the CPU 207 having received the notification of the completion causes the image processing unit 209 to execute the processing. The image processing unit 209 performs reading out with shifting of the accessed memory address by one line in the sub-scanning direction, in accordance with the inclination of the image data stored by the read image control unit 208, each time a certain amount of image data is read out in the main-scanning direction. Accordingly, distortion of the image due to inclination is corrected on the last output result.

Readout of image data is performed by burst access in order to increase the transfer efficiency. It is assumed that the burst length is fixed, and a readout amount of addresses per burst (unit readout amount) is set to a value evenly divisible by the scanning width. A readout address corresponding to each burst access is generated, in which the basic calculation method is to calculate by adding the address read out at the previous timing with an amount of addresses corresponding to the burst length and the bus width. Letting K be the added value, K=[bus width]×[burst length] holds. At the same time, the amount of data read out in the main-scanning direction is counted for shifting the line and determining completion of processing of one line. In addition, the register unit 211 is set therein the pixel width in the main-scanning direction (shift readout width, in the following) for shifting in the sub-scanning direction in accordance with inclination, and the line is shifted when the amount of data read out in the main operation direction reaches the shift readout width.

Figure 4:
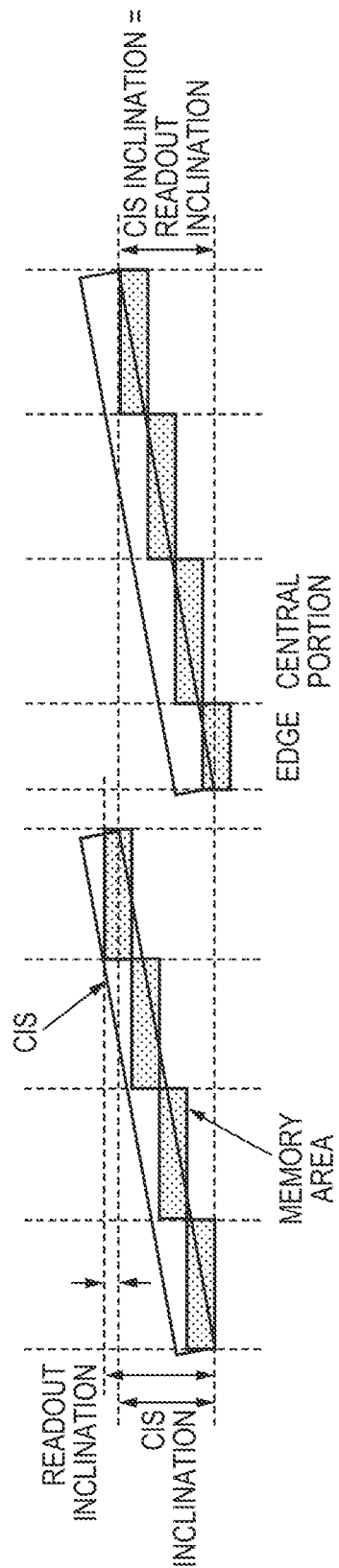
FIG. 4 is a diagram illustrating an effect of edge setting of a reading width according to the first embodiment.

The basic processing is performed for each line, with applying an individual setting of the edge only to the shift readout width at the head of each line, the precision of inclination correction is improved. FIG. 4 illustrates a case when the shift readout width is set to be equally divided (left-hand side) and a case when only the setting value of the edge of head side is changed (right-hand side). The edge setting value for the edge of head side serves to absorb decimal components of the maximum amount of displacement in the sub-scanning direction due to inclination. For example, when the maximum shift amount (maximum inclination amount) of the CIS 106 is 3.5 pixels, the decimal component is 0.5 pixels, as illustrated in FIG. 4, and, thus, the shift readout width at the edge of head side is set with a value half the shift readout width of the central part (parts excluding edges).

Figure 5A:
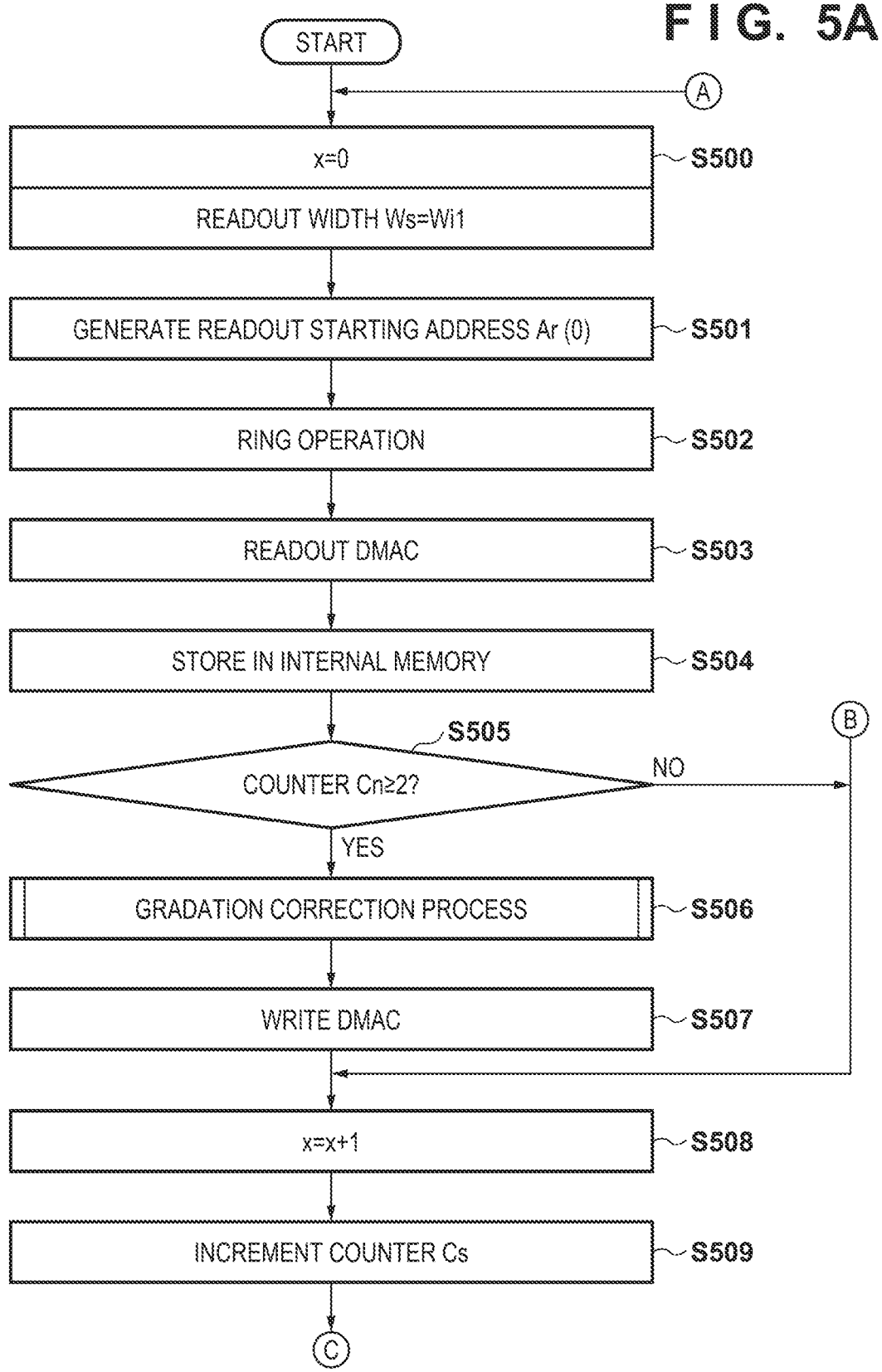
FIG. 5A is a flowchart illustrating an inclination correction operation of a scanner according to the first embodiment.
Figure 5B:
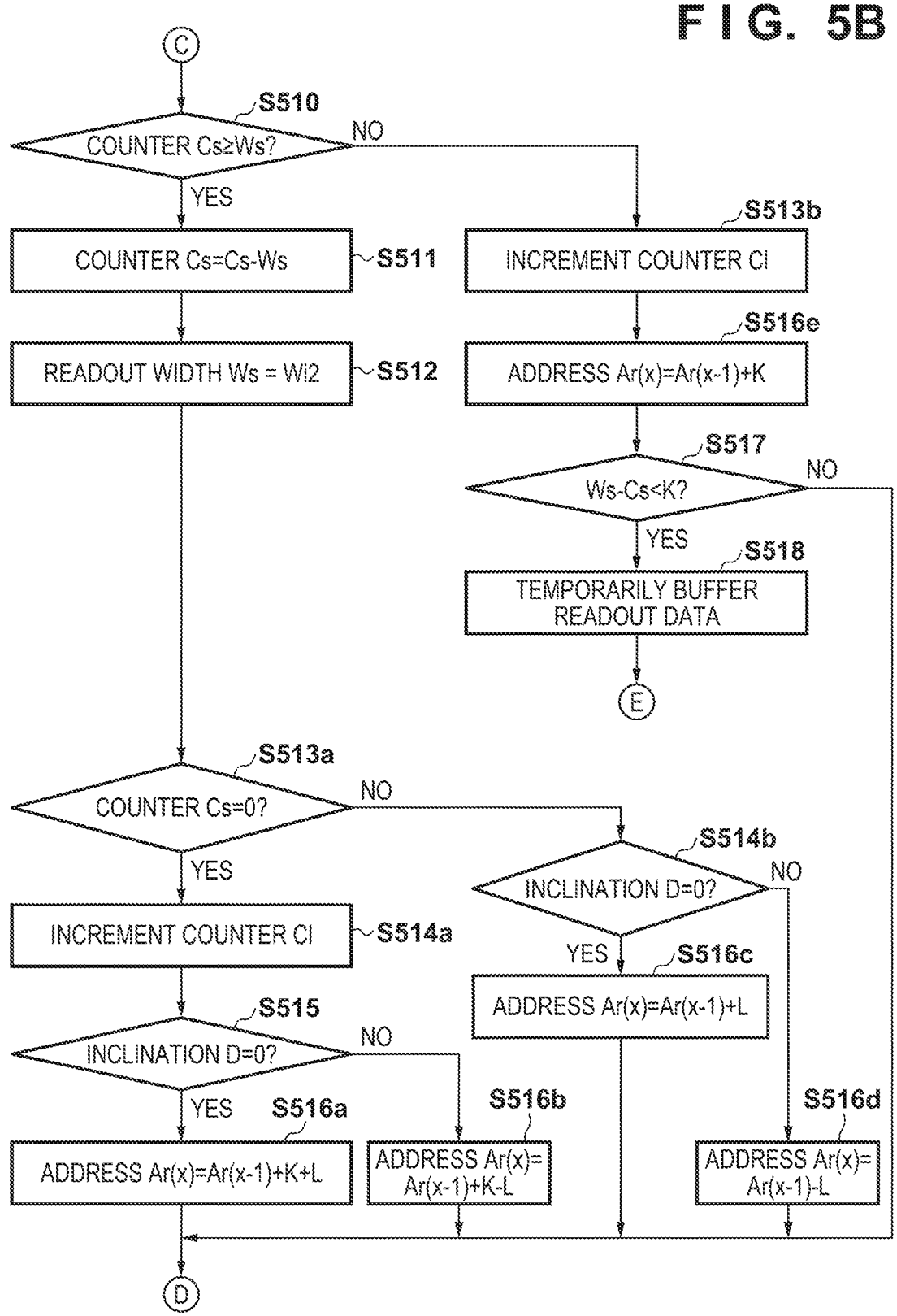
FIG. 5B is a flowchart illustrating an inclination correction operation of a scanner according to the first embodiment.
Figure 5C:
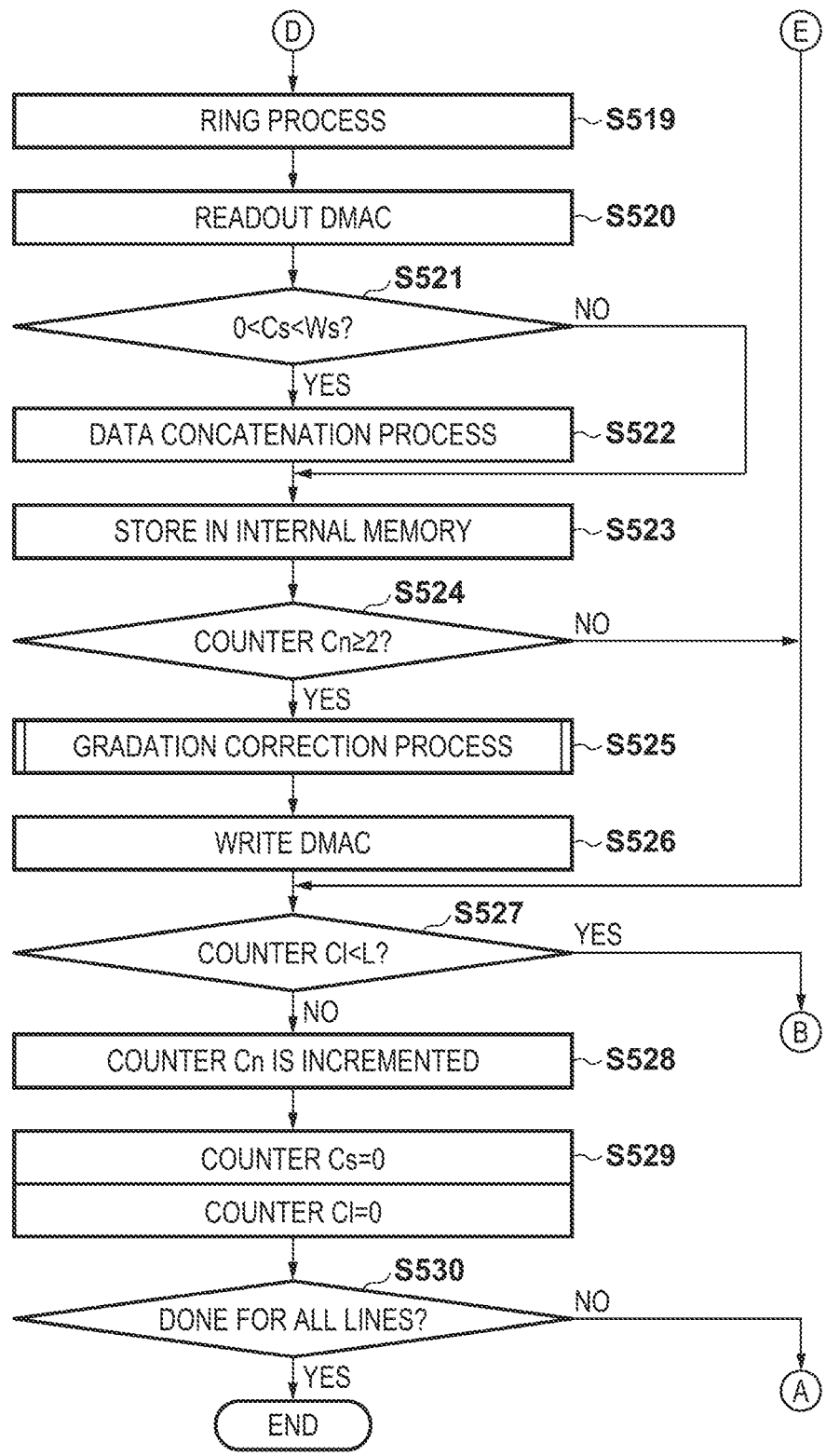
FIG. 5C is a flowchart illustrating an inclination correction operation of a scanner according to the first embodiment.

FIG. 5A to 5C are flowcharts illustrating an inclination correction operation on a read image data according to the first embodiment.

Before the operation of the flowchart is started, the register unit 211 is accessed by the CPU 207, receives parameters related to inclination correction of image data, and passes the parameters to respective blocks required for the inclination correction. The register unit 211, holding parameters as illustrated in FIG. 6A to FIG. 6C, holds a scanning width L of one line, an edge setting value Wi1 of a shift readout width, a central portion setting value Wi2 of the shift readout width, a readout starting address As, an inclination direction D (0:addition direction/1:subtraction direction), and ON/OFF (active/inactive) setting of the inclination correction function, and outputs the parameters to respective blocks.

The inclination correction process is performed line by line. There are provided, as counters to be used in the process, a Cn that counts the number of processed lines, an address counter Cl that counts the amount of data of one line, and an address counter Cs that counts the amount of data of the shift readout width.

Simultaneously to the start of processing, an edge setting value Wi1 is set to the shift readout width Ws (S500). The reading address Ar generated in one line is provided with numbers (x=0, 1, 2, . . . , n), and the readout address are denoted by Ar(x) in the following. FIGS. 6A to 6C illustrate image data allocation in the memory 205 storing the data read out by the image processing unit 209, the lateral width L representing the scanning width of the CIS 106. The last address of each line and the first address of the next line are successive. Letting the head address be 0x0000, the head address of the second line corresponds to a value to which the addresses of the scanning width L are added.

The outline of the inclination correction process according to the present embodiment will be further described, referring to FIGS. 6A to 6C.

In FIGS. 6A to 6C, the amount of one time data readout in the main-scanning direction is determined based on the burst length, for example, it is intended that readout of one line is completed by 18 (multiple) times of readout, as indicated by the numbers 0 to 17 in the drawings. Additionally, in FIGS. 6A to 6C, the image data indicates a state in which an inclination amount d of a scanning width L is equal to or greater than five lines and fewer than six lines, as indicated by the straight line S. In this case, fractions that are decimal values (decimal part), being a part equal to or greater than five lines, of the inclination amount d of the straight line S is corrected with the shift readout width of the edge portion of head side being Wi1, and the inclination amount of the remaining five lines is corrected with subsequent shift readout width being the regularly allocated shift readout width Wi2. The straight line S indicating the inclination of the data to be corrected is in a state when the line enters the second line at the edge position C of the shift readout width Wi1 from the edge of head side of data readout.

In addition, readout of data from the buffer memory is performed with a readout width B using the burst length as a reference, as has been already described. Accordingly, as illustrated in FIG. 6A, when a unit of readout is fixed to a value B based on the burst length, the readout width exceeds the edge position C of the shift readout width Wi1 in reading the address Ar(2), for example. Therefore, the present embodiment separates the readout at the address Ar(2) and the readout at the address Ar(3) by the edge position C as the boundary, as illustrated in FIG. 6B. Then, as illustrated in FIG. 6C, inclination is corrected by performing data shift by one line for the address Ar(3) without shifting data for the address Ar(2), and concatenating both data. The same goes for the subsequent addresses Ar(4) to Ar(17). The foregoing provides an overview of the inclination correction according to the present embodiment.

Returning to description of FIG. 5A to 5C, the memory address As at the start of correction is set in the register unit 211, and the starting address processing unit 213 and the address generation unit 214 first calculate the address Ar(0). When the calculation result specifies an address outside the buffer area, data is read out and stored in the internal memory 212 (S501 to S504) after having performed a ring process. In addition, when there are already two or more processed lines, the DMAC 210 writes to the memory 205 after gradation correction is performed (S505 to S507, S524 to S526). Details of this process will be described later. The counter Cs is incremented with the data amount K being read (S509).

The shift determination unit 215 determines whether or not to execute a line shift process. The address generated in the shift execution is calculated (S516*a* to S516*e*) from the scanning width and the inclination direction of one line, which is set in the register unit 211.

In FIG. 7A, since the memory address is inclined in the addition direction, the amount of addresses of the scanning width is added in addition to the amount of addresses of the burst length (Ar(x1)+K=Ar(x−1)+K+L). By the process of adding the amount of addresses, the data at the position (line position) of the address Ar(x−1)+K+L is shifted by one line to the position of an address Ar(x−1)+K adjacent by one line, whereby the inclination correction is performed. Although the same goes for FIG. 7B, subtraction is performed, instead of addition (Ar(x)=Ar(x−1)+K−L).

When a ring process of the data storage buffer is required as with the case of the address Ar(0), readout is performed after the ring process is performed (S519 to S520, S523).

However, as has already been explained, such as x=2 and x=3 as well as x=5 and x=6 in FIGS. 6A to 6C, for example, when image data of successive addresses in the main-scanning direction is read out by a fixed burst length, the position where the address should be shifted may be exceeded (edge position C in FIG. 6A). In such a case, the last data of the burst access exceeds the shift position, which may result in reading unnecessary data. In this case, arithmetic operation processing is added (S510 to S515).

Specifically, there will be described a case when the inclination amount d of the scanning width L in FIG. 6A is exactly six lines. When the shift readout width Ws at the edge and the center is L/6 and a one-time readout width by burst access is Ws×(3/7), the total readout amount will be Ws×(9/7) at the third reading (x=2), that exceeds Ws (edge position C). Under this condition, readout is performed once again even at the same main-scanning position in shifting in the sub-scanning direction, as with the case of x=3. In other words, the next reading address Ar(x) is set to an address shifted at the same main-scanning position as the previous reading address Ar(x−1), (Ar(x)=Ar(x−1)−L). In this case, a process is additionally performed in which the first half data of Ar(x−1) and the second half data of Ar(x) that are effective data are concatenated using the edge position C as the boundary, as in FIGS. 6B and 6C, and discard the remaining data (S521 to S522).

Whether or not to execute the concatenation process of shift data is determined based on the value of the shift counter Cs, and the concatenation process is executed when the condition Cs>Ws is satisfied. The first half data is temporarily buffered without being written by the DMAC 210, and written after the concatenation is executed when the second half data is read out (S517 to S518).

The reset process of the shift counter Cs sets Cs−Ws, which is the extend-off amount from the shift readout width (S511). In addition, since two reading addresses are generated at a same main-scanning position, the one-line data amount Cl is not incremented when generating the address of the first half data. When the data amount Cs of the shift readout width becomes identical value with the shift readout width (Cs=Ws) at a certain scanning timing such as x=8 in FIG. 6A, the concatenation process of shift data is not executed (S513).

The shift readout width Ws set at the head of each line is the parameter Wi1 that is for an edge, when the line is shifted once, the edge processing is completed, and the shift readout width Ws is set by replacing to the parameter Wi2 of the central portion (S512).

Subsequent processing is continued by using the same parameter, and when the number of processing pixels reaches the data amount Cl of one line with regard to the last line, the processing is terminated with one line regardless of the shift readout width Ws, Cl and Cs are reset, and Cn is incremented (S528 to S529).

In addition, along with generation of the head address Ar(0) of the next line, the shift readout width Ws is changed to Wi1.

As illustrated in FIG. 8, continuity of the image may not be maintained by only shifting the line in the sub-scanning direction, and, therefore, a gradation correction process is performed using a filter weighted in the sub-scanning direction. A filtering process is performed on three pixels including upper and lower pixels, the centroid position of the filter is moved from top to bottom, or from bottom to top, starting from one edge of the shift readout width to the other edge. The movement direction is adjusted with the inclination of the image data, and eventually the gradation in the main-scanning direction is matched.

Figure 9:
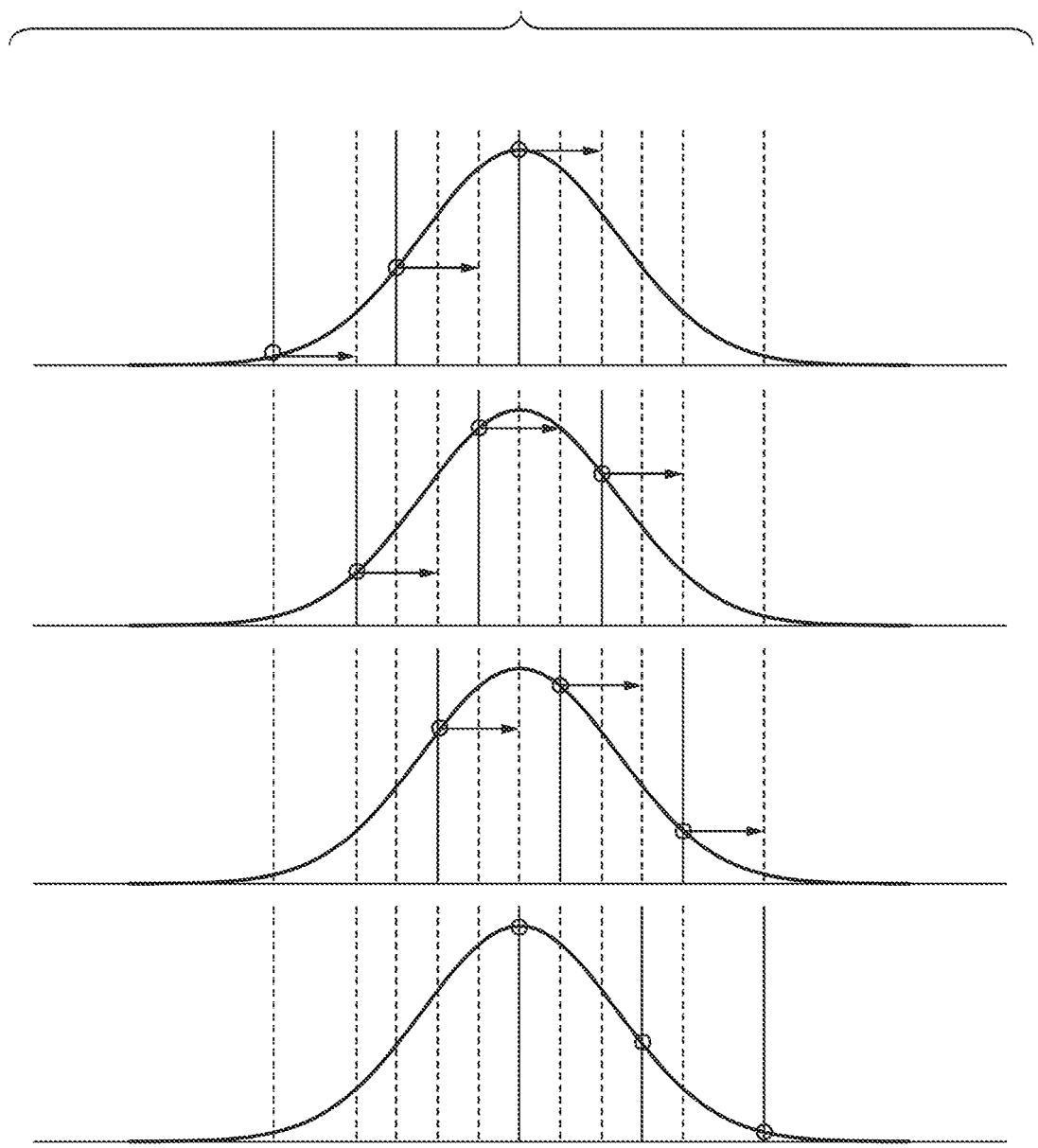
FIG. 9 is a diagram illustrating a calculation method of a weighting filter according to the first embodiment.

As illustrated in FIG. 9, a filter coefficient for the three pixels in the sub-scanning direction are calculated such that a value corresponding to shift readout width is calculated from a Gaussian function to make the centroid shift in the main-scanning direction, and the filter coefficient is stored in the internal memory 212. The same filter is repeatedly applied for each shift readout width, as in the right view of FIG. 8, the same filter is repeated for every four pixels. With regard to the edge processing, continuity of the image at the shift boundary is maintained by shifting the starting position of the filter to be applied in accordance with the set pixel width. For example, when six pixels for Wi1, 16 pixels for Wi2, and 16 filter coefficients of the gradation correction process are prepared, in the edge at the start of processing, the coefficient is used starting from the 11-th coefficient, and the 16-th coefficient is used at the sixth pixel that is the last pixel. After the shift readout width is switched to Wi2 after the line shift, the filtering process is performed by returning to the first coefficient.

The internal memory 212 has prepared therein image data buffer area covering three lines, in addition to the storage area for filter coefficients. Data of two lines are stored at the start of processing, and subsequently when data readout of the third line is started, the data of the third line is stored into the internal memory 212, and also gradation correction is executed on data of the former two lines using data of three pixels in the sub-scanning direction of the data of the third line, and then the corrected data is written to the memory 205. Upon completion of reading data of the third line, the data of the fourth line is overwritten on the memory area of the first line, and, simultaneously, the gradation correction process is performed using data of the second and the third lines, and the corrected data are written to the memory 205. Similar processing continues thereafter.

The aforementioned process is repeated on each line as many processes as the required number of lines in accordance with the size of the original, and the overall processing by the image processing unit 209 is terminated (S530).

As has been described above, the aforementioned embodiment allows for accurately correcting inclination with respect to the inclination of the linear image sensor, even when the maximum deviation amount in the sub-scanning direction due to inclination is not an integer multiple of the pixel width, whereby inclination can be corrected with a higher precision.

Second Embodiment

In the present embodiment, in addition to the correction by the first embodiment, in a case in which image data from a plurality of CISs 106 are concatenated, the inclination correction reference position of each of the plurality of CISs 106 in the sub-scanning direction are adjusted in units of less than one pixel. Accordingly, the precision in concatenating image data of each of the plurality of CISs 106 are improved.

Figure 10:
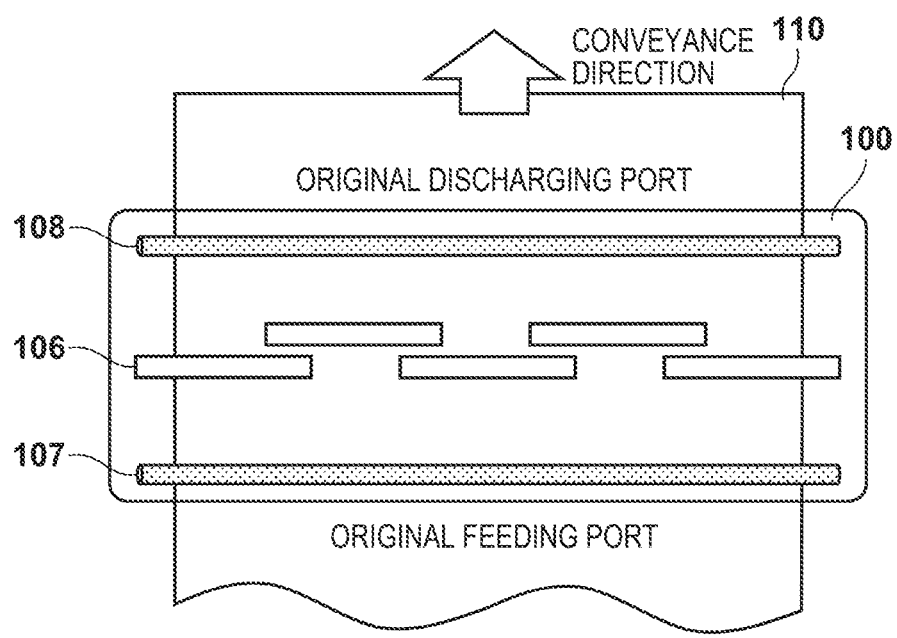
FIG. 10 is a diagram illustrating an overall configuration of a large-size scanner according to a second embodiment.

FIG. 10 illustrates a scanner adapted for a large original particularly exceeding the A3 size, which generally includes a plurality of CISs 106 aligned in the main-scanning direction to implement reading of the large original. In addition, occurrence of missing in reading can be prevented, even when an mounting error is occurred, by shifting the positions of adjacent CISs 106 in the sub-scanning direction and arranging them in the main-scanning direction in a staggered manner with overlapping their reading areas one after another by a constant width. Here, one CIS 106 closer to the original feeding port 101, among two adjacent CISs 106 arranged side by side in the sub-scanning direction, is referred to as the front CIS, and the distant one is referred to as the rear CIS.

With the sheet feed scheme, reading is performed by rotating the conveyance rollers 107 and 108 with the conveyance motor, and conveying at a constant speed in a direction orthogonal to the arrangement direction of the linear sensor fixed within the apparatus. The aforementioned configuration requires concatenation of the data read by each of the CISs 106, and the mounting offset amount in the sub-scanning direction is absorbed at the timing of storing in the memory by the read image control unit.

Figure 11:
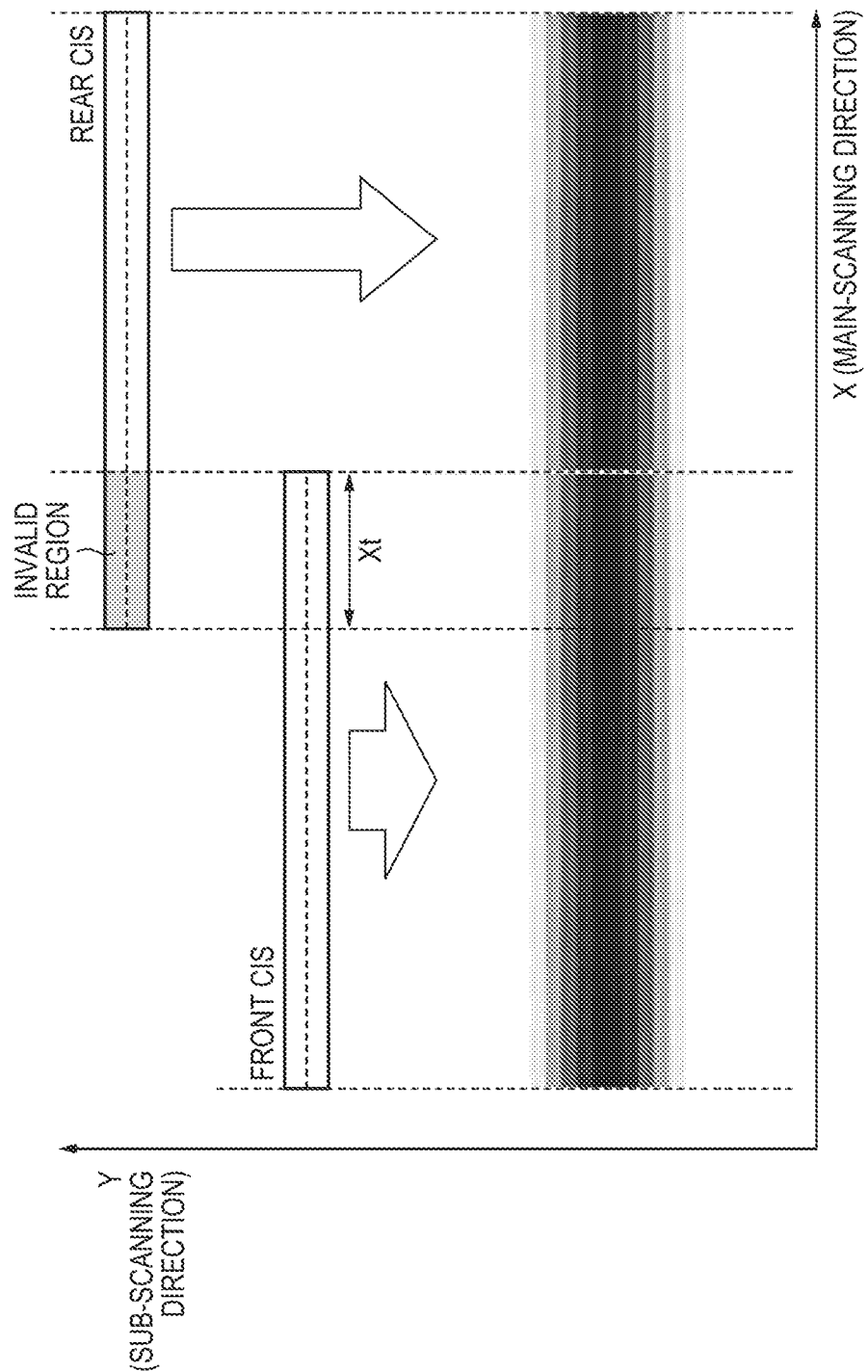
FIG. 11 is a diagram illustrating an exemplary process of concatenating image data from a plurality of CISs according to the second embodiment.

As illustrated in FIG. 11, the method of the CIS concatenation process, is performed by concatenating image data of the front CIS and the rear CIS such that, for example, pixels of the front CIS and the rear CIS are joined as pixels of the rear CIS, in which pixels in an overlapping area are subtracted from the head of the rear CIS pixels, continuously follow the last pixel of the front CIS. The register unit 211 holds as a parameter, the width Xt of the overlapping area of the CISs 106 depending on the mounting state of the CISs 106, as additional information. The parameter is also preliminarily set by calibration.

The CISs 106 have respective inclination components depending on the mounting state, and each parameters of the CISs 106 are also set in the register of the image processing unit 209. The image processing unit 209 performs processes corresponding to respective inclination for each of the CISs 106.

Figure 12:
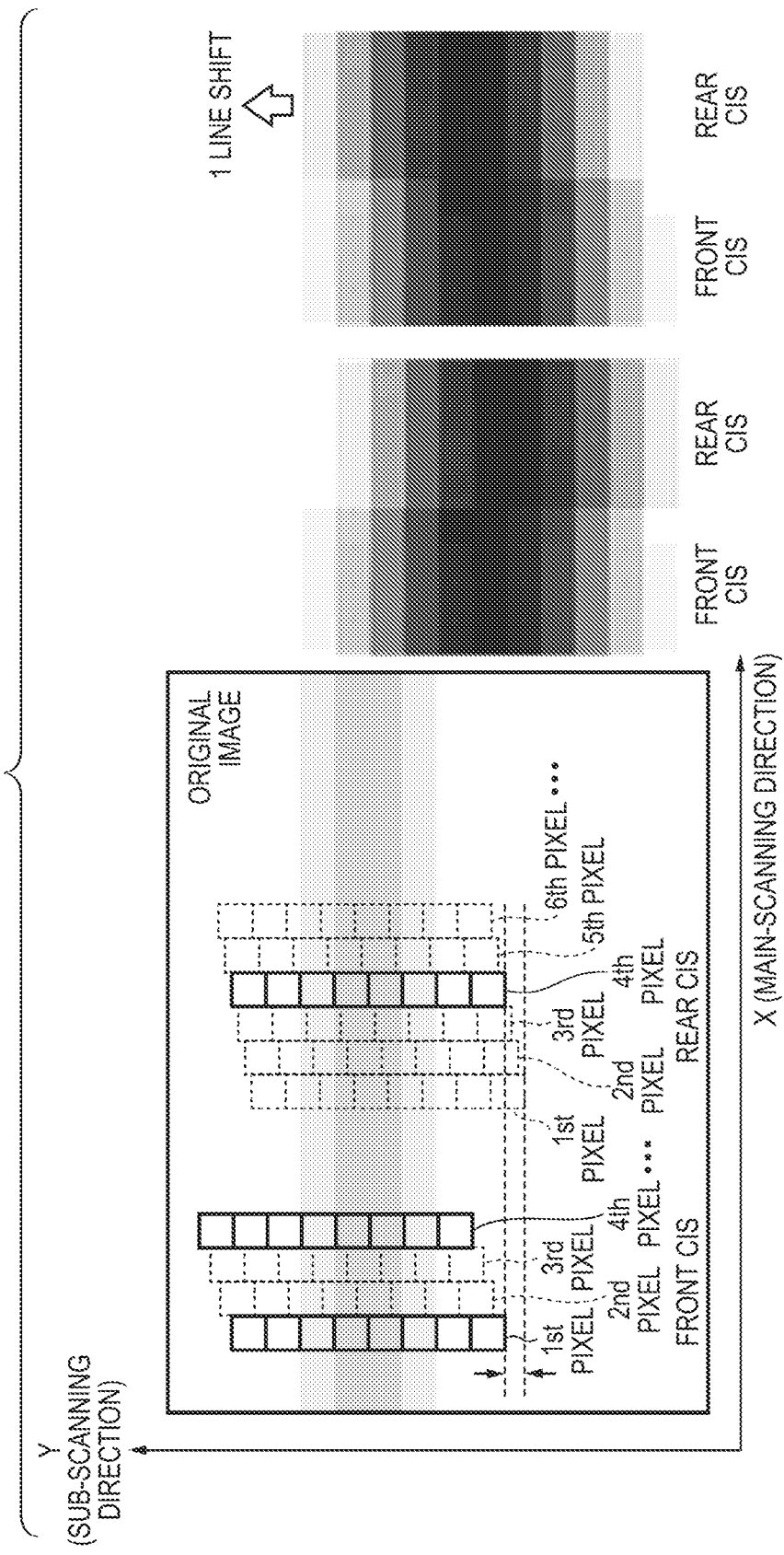
FIG. 12 is a diagram illustrating a positional deviation in the sub-scanning direction of a plurality of CISs according to the second embodiment.

FIG. 12 illustrates deviation of image reading timing (pixel position) in the front and the rear CISs 106 that are differently inclined and arranged in a staggered manner, and a first pixel of each CIS is representing head pixels. In a case when the head pixel of each CIS 106 includes a deviation amount of less than the resolution (reading pixel) in the sub-scanning direction (0.5 pixel in the example of FIG. 12), if the reference position of gradation correction in the sub-scanning direction is fixed at the edge of each of the CISs 106, processing is performed with that position as the correction criterion, and the gradation of the overall correction result may also deviate correspondingly.

As in the right-hand side of FIG. 12, when an adjustment by shifting the readout line is attempted, only a pixel-by-pixel adjustment is allowed, and, therefore, the precision of correction is insufficient for the image continuity at the concatenated position. Therefore, when a deviation amount of less than one pixel is included, it becomes necessary to adjust the correction reference position in the sub-scanning direction in units of less than one pixel, by adjusting the starting position of the weighting filter at the edge. For example, as in the left-hand side of FIG. 12, the shift readout widths of the front and the rear CISs, i.e., the pixel width in the main-scanning direction for one pixel deviation in the reading pixels in the sub-scanning direction due to inclination, are respectively three and six pixels. In order to match the gradation of the rear CIS to the gradation of the head of the front CIS, since the timing matches at the fourth pixel in the rear CIS, by setting the edge shift of the rear CIS to be three pixels, the reference position of gradation correction can be aligned with that of the front CIS. As a result, gradation deviation in the sub-scanning direction can be corrected at the concatenated position, whereby it is possible to concatenate image data between the CISs 106 more smoothly.

Figure 13:
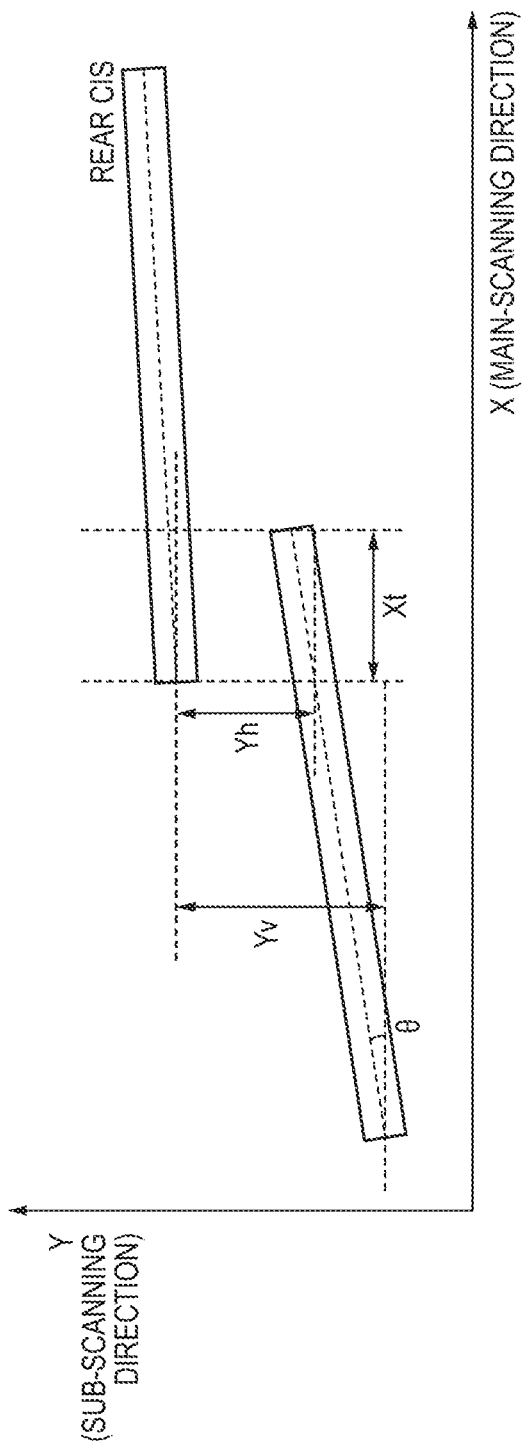
FIG. 13 is a diagram illustrating parameters required for a highly precise concatenation process of a plurality of CISs according to the second embodiment.

A specific calculation method will be presented below. FIG. 13 illustrates a positional relation between the front CIS and the rear CIS, which are differently inclined. First, inclination correction is performed for each CIS 106 according to the method described in the first embodiment. In the present embodiment, it is assumed that, for each of the CISs 106, the shift readout widths of the edge and the central portion set for inclination correction of the CIS 106 alone are identical (Wi1=Wi2). In other words, the widths are equally divided, although the numbers of divisions are different.

The offset amount in the sub-scanning direction of the adjacent CISs 106 is preliminarily set by calibration. For example, a chart having a predetermined pattern printed thereon is read by the CISs 106 while the chart is conveyed at a constant speed, and a deviation amount Yh in the sub-scanning direction is determined from the difference in reading timings of the overlapping area between the adjacent CISs 106. Next, a deviation amount Yv in the sub-scanning direction of the head pixel of the front CIS and the rear CIS is calculated from preliminarily measured inclination information of the front CIS.

First, the deviation amount in the sub-scanning direction in an overlapping area at the same main-scanning position is acquired by reading the chart. Particularly, a deviation amount Yh is acquired between a position located at the last pixel of the front CIS after the number of pixels Xt of the overlapping area is subtracted from the last pixel of the front CIS, and the head pixel of the rear CIS. For example, the distance is calculated from a sensor that detects the conveyance amount of the original and the detection timing of the pattern in each of the CISs 106.

The distance Yv between head pixels can be calculated by Yv=Yh+(L−Xt/cos θ)sin θ, using the scanning width L of the CIS 106 and the inclination angle θ of the front CIS. Settings of the edge are adjusted from the value of the decimal part Yvd (Yv=Yvi+Yd) without using the integer part Yvi of Yv. When Yvd is 0, the starting position of the weighting filter need not be changed. When 0<Yvd<1 holds, the filtering starting position is selected from its relation with the shift readout width. For example, in a case when the number of the central shift readout widths and the filter coefficients is eight, and 0.5 is included after the decimal point of the aforementioned calculation result Yv, in order to adjust the 0.5-pixel deviation, filters are used starting from the fifth filter assuming that the shift readout width of the edge being four pixels. In the event of a line shift, the coefficient returns to the first coefficient.

Figure 14A:
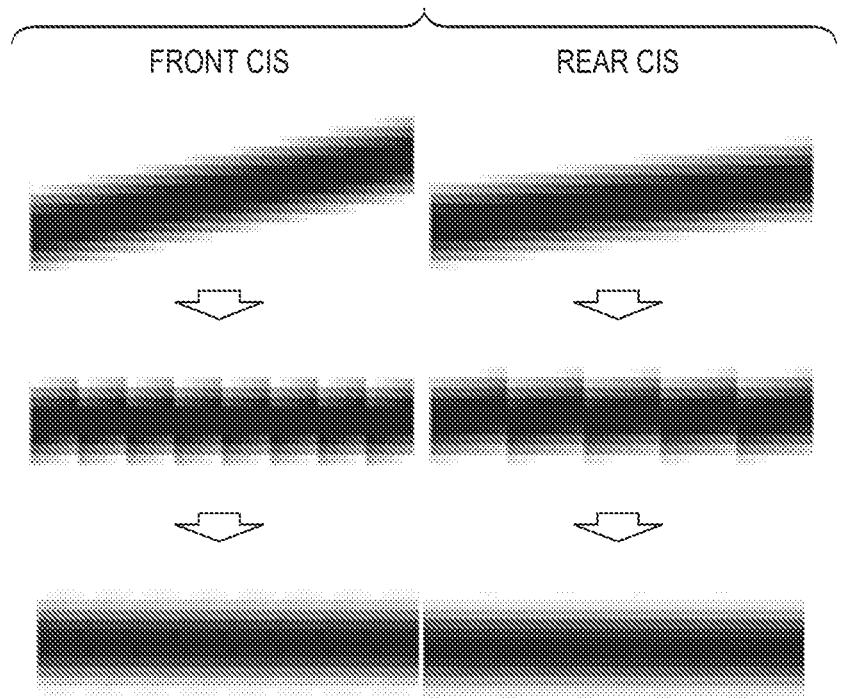
FIGS. 14A and 14B are diagrams illustrating differences in correction results due to presence or absence of edge processing according to the second embodiment.
Figure 14B:
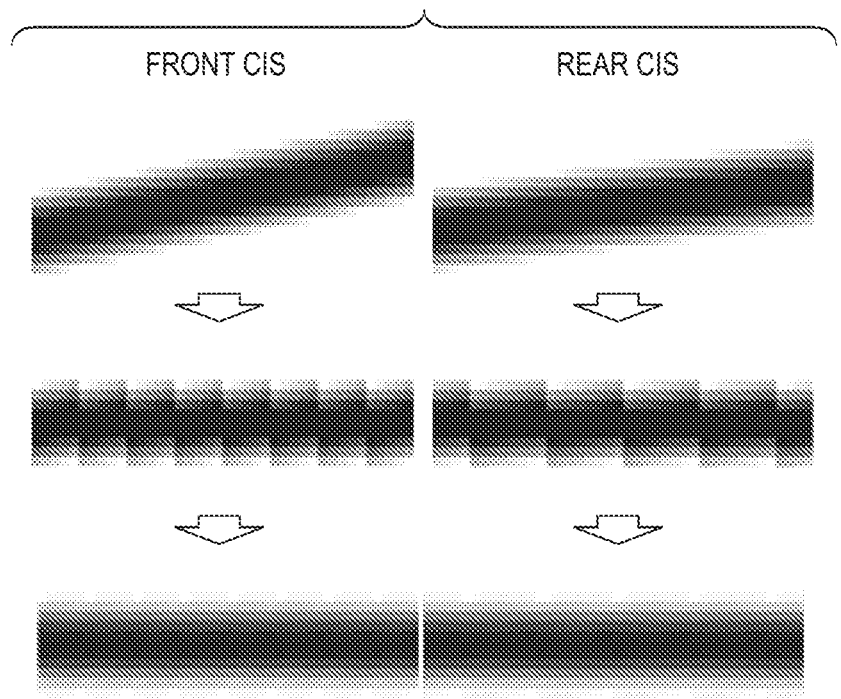

FIGS. 14A and 14B respectively illustrate shift results of not applying and applying the edge setting. By using gradation reference position adjustment of the edge, the position in the sub-scanning direction of the image is shifted by less than one pixel, thereby the concatenated position is smoothed.

Although the shift readout width is presented as being equally divided in the example described above, in a case when the shift readout width of the edge in the inclination correction of the rear CIS is different from that of the center, the width of the leading edge required for the concatenation process is set and the remaining pixel width is processed (distributed) at an end point as remainder.

Letting Wi1' be the head width for concatenation, as illustrated in FIG. 15, the order of processing the shift readout width is Wi1'→Wi2→Wi2→Wi2→ . . . →Wi2→ (Wi1−Wi1'). The sum of the foregoing widths is L, although the overall inclination does not change.

When connecting the third CIS 106, the second and the third CISs 106 are processed similarly as the front CIS and the rear CIS, based on the second correction center calculated from the relation between the first and the second CISs 106.

Although a single-body configuration of the scanner has been described in the aforementioned embodiments, there may also be a configuration in which a printer is included as a separate unit, and a built-in system controller inside the printer executes similar image processing.

As has been described above, in the aforementioned embodiment, inclination can be accurately corrected even when the maximum deviation amount in the sub-scanning direction due to inclination is not an integer multiple of the pixel width with respect to the inclination of the linear image sensor, whereby inclination can be corrected with a higher precision. In addition, when image data from a plurality of linear image sensors are concatenated as in a case of a large-scale scanner that reads a wide original, the concatenation precision can be improved by adjusting the inclination correction reference position of each linear image sensor in the sub-scanning direction in units of less than one pixel.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a storage device configured to store image data read by scanning, with a linear sensor including pixels arranged in a main-scanning direction, an original in a sub-scanning direction orthogonal to the main-scanning direction; and
at least one processor and at least one memory storing instructions to be executed by the at least one processor, such that the instructions, when executed, cause the at least one processor to function as:
an acquisition unit configured to acquire inclination information indicating inclination of the image data; and
a readout unit configured to read out the image data from the storage device, with shifting, in accordance with the inclination information, a line position in the sub-scanning direction by each predetermined number of pixels read out in the main-scanning direction, wherein the readout unit makes, based on the inclination information, the predetermined number at an edge in the main-scanning direction different from the predetermined number at other parts in the main-scanning direction, wherein, by reading out a unit readout amount that is a number of pixels based on a burst length, in a one-time readout in the main-scanning direction of the image data, the readout unit reads out image data of one line in the main-scanning direction in a plurality of times of readout and, when the predetermined number of pixels is not divisible by the unit readout amount, the image data read first after shifting the line position and the image data read last before shifting the line position are at the same position in the main scanning direction.

2. The image processing apparatus according to claim 1, wherein the storage device stores a part of the image data read by the linear sensor.

3. The image processing apparatus according to claim 2, wherein the storage device performs a ring process in a case when image data at the line position to be read out by the readout unit does not exist in the storage device.

4. The image processing apparatus according to claim 1, wherein the readout unit makes the predetermined number at an edge of a head in the main-scanning direction, different from the predetermined number at other parts in the main-scanning direction.

5. The image processing apparatus according to claim 1, wherein, in a case when an inclination amount in the main-scanning direction of the image data is not an integer multiple of the width of the pixel of the linear sensor, the readout unit sets the predetermined number at the edge in the main-scanning direction to correspond to a decimal part of the inclination amount that is not an integer multiple of the width of the pixel.

6. The image processing apparatus according to claim 1, wherein, when an integer multiple of the unit readout amount exceeds the predetermined number of pixels, image data without a shift of the line position and image data with a shift of the line position are concatenated and read out, with the exceeded position being the boundary.

7. The image processing apparatus according to claim 1, wherein the at least one processor further functions as a gradation correction unit configured to perform gradation correction to maintain continuity of an image at positions of pixels in the main-scanning direction in which the line position shifting in the sub-scanning direction is executed.

8. The image processing apparatus according to claim 7, wherein the gradation correction unit changes a starting position of a filter coefficient of the gradation correction, in accordance with the predetermined number of pixels at the edge in the main-scanning direction.

9. The image processing apparatus according to claim 1, wherein the readout unit distributes the predetermined number of pixels at the edge in the main-scanning direction to both ends in the main-scanning direction such that inclination of the entire reading does not change, the number of pixels having been calculated in the inclination correction of a single body of the linear sensor.

10. The image processing apparatus according to claim 9, wherein the readout unit sets the predetermined number of pixels at an edge in the main-scanning direction such that, when concatenating image data read by the plurality of the linear sensors, the image data are concatenated in units of fewer than one pixel, based on a correction reference position in the sub-scanning direction of head pixels of image sensors adjacent to each other.

11. An image reading apparatus comprising:
    the image processing apparatus according to claim 1; and
    a reading unit configured to read, by scanning an original in a sub-scanning direction orthogonal to the main-scanning direction, with a linear sensor including pixels arranged in the main-scanning direction.

12. A method of controlling an image processing apparatus that includes a storage device configured to store image data read by scanning, with a linear sensor including pixels arranged in a main-scanning direction, an original in a sub-scanning direction orthogonal to the main-scanning direction, the method comprising:
    acquiring inclination information indicating inclination of the image data; and
    reading out, with a readout unit, the image data from the storage device, shifting, in accordance with the inclination information, a line position in the sub-scanning direction by each predetermined number of pixels read out in the main-scanning direction, wherein the reading out makes, based on the inclination information, the predetermined number at an edge in the main-scanning direction different from the predetermined number at other parts in the main-scanning direction, wherein, by reading out a unit readout amount that is a number of pixels based on a burst length, in a one-time readout in the main-scanning direction of the image data, the readout unit reads out image data of one line in the main-scanning direction in a plurality of times of readout and, when the predetermined number of pixels is not divisible by the unit readout amount, the image data read first after shifting the line position and the image data read last before shifting the line position are at the same position in the main scanning direction.

13. A non-transitory computer readable storage medium storing a program for causing a computer to execute each step of a method of controlling an image processing apparatus that includes a storage device configured to store image data read by scanning, with a linear sensor including pixels arranged in a main-scanning direction, an original in a sub-scanning direction orthogonal to the main-scanning direction, the method comprising:
    acquiring inclination information indicating inclination of the image data; and
    reading out, with a readout unit, the image data from the storage device, shifting, in accordance with the inclination information, a line position in the sub-scanning direction by each predetermined number of pixels read out in the main-scanning direction, wherein the reading out makes, based on the inclination information, the predetermined number at an edge in the main-scanning direction different from the predetermined number at other parts in the main-scanning direction,
    wherein, by reading out a unit readout amount that is a number of pixels based on a burst length, in a one-time readout in the main-scanning direction of the image data, the readout unit reads out image data of one line in the main-scanning direction in a plurality of times of readout and, when the predetermined number of pixels is not divisible by the unit readout amount, the image data read first after shifting the line position and the image data read last before shifting the line position are at the same position in the main scanning direction.

* * * * *